United States Patent [19]

Dean

[11] Patent Number: 4,620,629
[45] Date of Patent: Nov. 4, 1986

[54] SIDE GUIDE FOR AIRCRAFT BELT LOADER

[75] Inventor: William C. Dean, Orange, Fla.
[73] Assignee: FMC Corporation, Chicago, Ill.
[21] Appl. No.: 707,634
[22] Filed: Mar. 4, 1985
[51] Int. Cl.[4] .............................................. B65G 21/20
[52] U.S. Cl. .................... 198/836; 198/861.5
[58] Field of Search .................... 198/836, 632, 861.1, 198/861.5, 300, 318; 182/159, 160; 312/91; 193/17; 211/70.4; 5/425, 428, 430

[56] References Cited

U.S. PATENT DOCUMENTS

| | | | |
|---|---|---|---|
| 598,735 | 2/1898 | Megins ................................. | 5/430 |
| 2,156,020 | 4/1939 | Lathrop ............................... | 198/836 |
| 2,929,078 | 3/1960 | Smith et al. ........................ | 5/428 |
| 3,051,295 | 8/1962 | Moy .................................... | 198/318 X |
| 4,274,529 | 6/1981 | Mori et al. ......................... | 198/861.1 X |

FOREIGN PATENT DOCUMENTS 252460 10/1912 Fed. Rep. of Germany .......... 5/428

Primary Examiner—Leslie J. Paperner
Assistant Examiner—Jonathan D. Holmes
Attorney, Agent, or Firm—Ronald C. Kamp; Richard B. Megley

[57] ABSTRACT

A side guide for an aircraft belt loader including a guide rail positioned laterally adjacent to the belt loader conveyor and pivotally supported on the belt loader conveyor frame by a plurality of links. A bell crank attached to the guide rail and the conveyor frame includes a control lever for manual rotation of the bell crank to move the guide rail between lowered and elevated positions relative to the belt loader conveyor.

3 Claims, 3 Drawing Figures

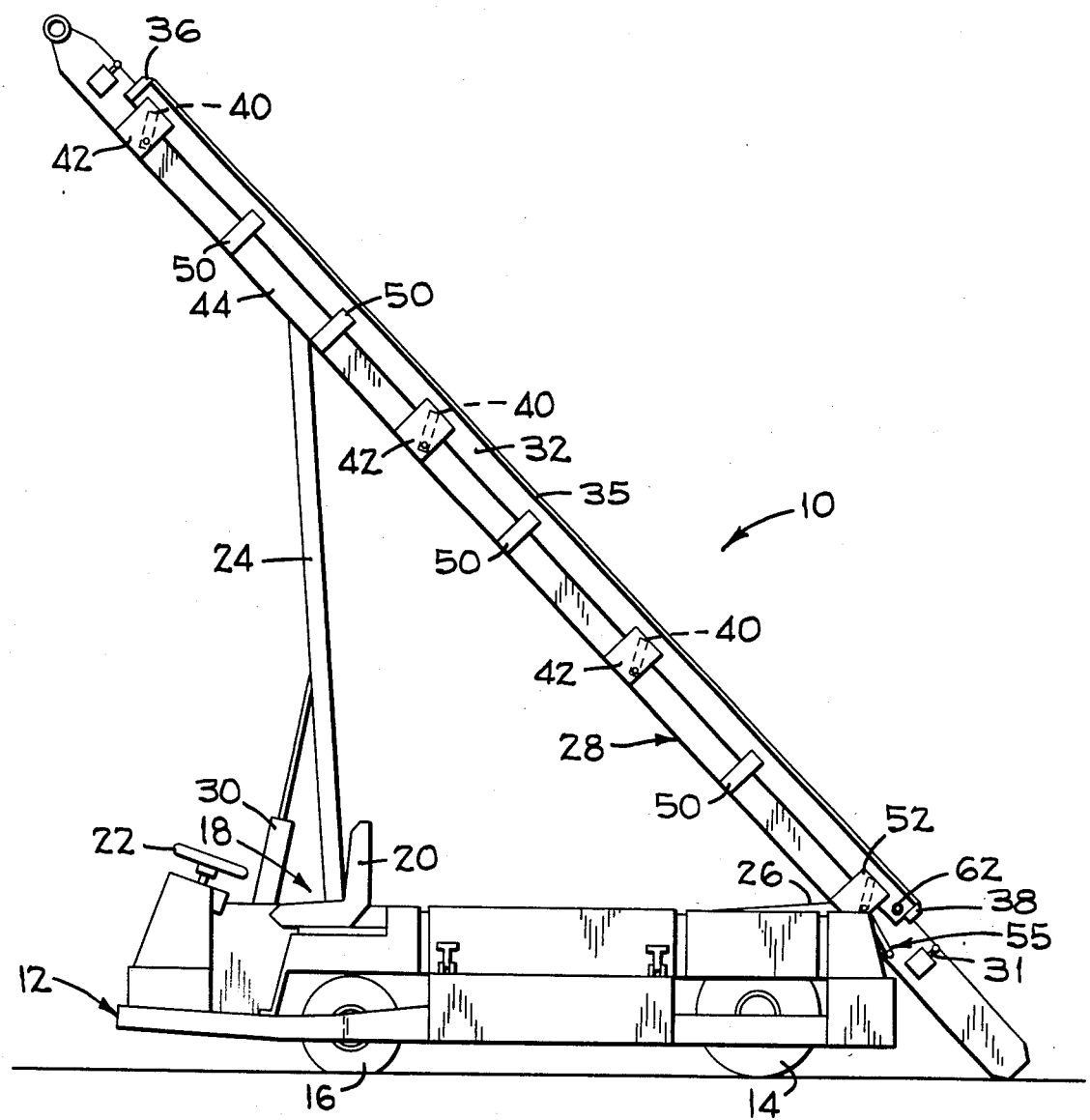
FIG_1

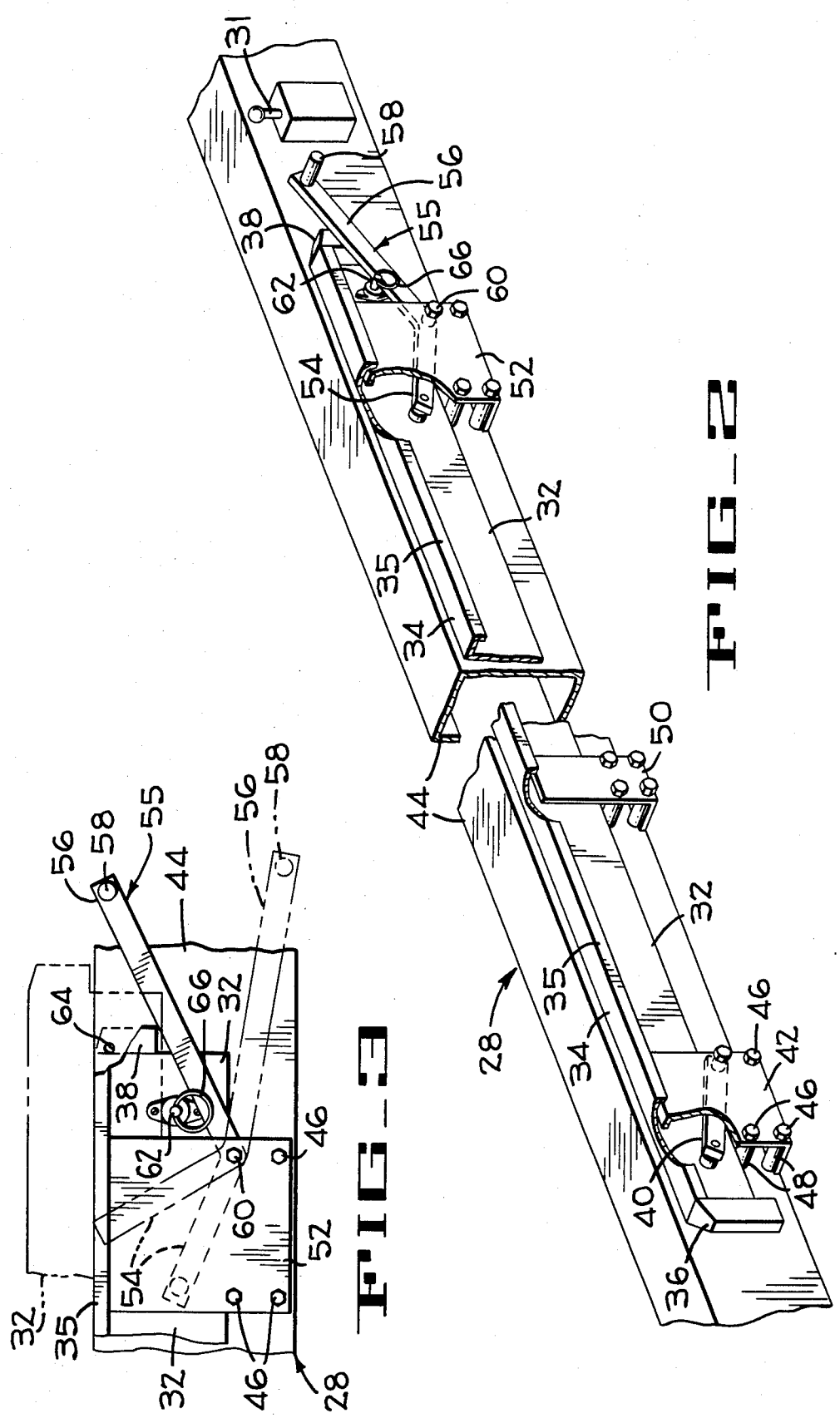

SIDE GUIDE FOR AIRCRAFT BELT LOADER

This invention relates generally to side guides for conveyors, and more particularly, to such guides for aircraft belt loaders.

In transferring luggage and packages between aircraft and wheeled baggage carts, time is important. The luggage and packages must be placed on or removed from the conveyor of the belt loader in rapid succession and yet must not be permitted to fall from the conveyor. A side guide is often provided to aid in placement of the luggage and to reduce the possibility of any being forced off the conveyor by one piece engaging a stationary obstacle.

Depending on the configuration of the aircraft and/or the placement of the baggage cart relative to the loader, the guide may be useful on only one side of the conveyor; the guide on the other side often being a hindrance if protruding above the level of the conveyor belt. The present invention provides a side guide for the conveyor of an aircraft belt loader which can be easily raised and lowered, which can be readily and positively positioned regardless of the angular orientation of the conveyor, and which is relatively strong and rigid to permit it to function effectively.

A preferred embodiment of the present invention is illustrated in the drawings, wherein:

FIG. 1 is a side elevational view of an aircraft belt loader incorporating a side guide according to the present invention;

FIG. 2 is a three dimensional view, with portions broken away, of the side guide shown in FIG. 1; and FIG. 3 is a detailed side view, with portions broken away, of the actuating and locking mechanism for the side guide shown in FIGS. 1 and 2.

Referring to FIG. 1, there is shown an aircraft belt loader, indicated generally at 10, having a chassis 12 supported on a pair of drive wheels 14 at the rear and a pair of steerable wheels 16 at the front. An operator compartment 18 is provided at the front of the chassis 12 and includes a seat 20 and a steering wheel 22 for control of the steerable wheels 16. A pair of links 24 and 26 are each pivotally mounted at one end of the chassis 12 and at the other end to a belt conveyor 28. A pair of hydraulic rams, are pivotally attached between the chassis 12 and one of the links 24 and 26; one of these rams is shown at 30 pivotally connected at its head end to the chassis and at its rod end to the link 24. Extension of the rams will cause the associated end of the conveyor 28 to be elevated, and retraction will lower the associated end. Control levers (not shown) in the operator compartment 18 permit angular positioning of the conveyor 28, by controlling the flow of hydraulic fluid to and from the rams. The belt conveyor 28 also includes a reversibly driven belt (not shown), the control of which is by means of control lever 31.

As best seen in FIG. 2, the side guide includes a guide rail 32 having an integral flange 34 with a downturned lip 35 along its upper edge to increase the moment of inertia and thereby render the guide rail 32 relatively rigid to loads imposed thereon in a direction transverse to the major dimension of the guide rail. Nose guides 36 and 38 are attached at the front and rear ends respective of the rail 32, and are tapered to urge luggage and packages coming into engagement therewith toward the middle of the conveyor. A plurality of links 40 are each rotatably pinned to the rail 32 and to brackets 42 which are attached to and spaced from the side frame 44 forming a part of the conveyor 28 by means of bolts 46 extending through spacer tubes 48. The upper edge of the brackets 42 are positioned to engage the flange 34 when the upper surface thereof is slightly below the level of the side frame 44. Additional support brackets 50 are similarly attached to the side frame 44 and equally spaced along the length of the guide rail 34, when in its lowered position, as shown in FIG. 2, to provide support for the flange 34 and thereby reduce the possibility of the rail being bent.

A bracket 52, which is identical to brackets 42 is similarly attached to the rear end of the side frame 44. A bell crank 55 including a link arm 54 pinned to the guide rail 32 and an actuating lever 56 is rotably pinned to the bracket 52. The link arm 54 has the same effective length and the same angular orientation as the links 40. The actuating lever 56 is provided with a transversely extending handle 58 which permit rotation of the bell crank 55 about the center of bolt 60. The actuating lever 56 extends toward the directional control lever 31 so that the handle 58 is adjacent the control lever 31 to facilitate control of both the powered belt and the position of the guide rail 32 with minimal personnel effort.

As best shown in FIG. 3, a spring-loaded pin 62 is attached to the rail 32 and is urged by the self-contained spring toward frame 44. A pair of holes, one of which is shown at 64 and the other is directly behind the pin 62 in FIG. 3, are provided in the frame 44. The two holes are positioned in the frame on the arc of a circle defined by the motion of the rail 32 as it is moved between its lowered inoperative or stored position and its elevated or operative position. In the latter position the rail 32 extends above the frame 44 to function as a placement back stop and to diminish the possibility of conveyed material falling from the conveyor. It should be noted that the lever 56 is oriented so that it always remains below the level of the frame 44.

In the lowered position, as shown in FIG. 2 and in solid lines in FIG. 3, the pin 62 engages the lower hole (not shown) in the frame 44 and retains the rail 32 below the level of the frame 44. By pulling on ring 66, the pin 62 is extracted from that hole and rotation of the lever 56 clockwise will cause the rail 32 to move to its elevated position. The pin 62 will automatically engage the upper hole 64 in the frame 44 and retain and lock the rail 32 in its elevated position as shown in FIG. 1 and by dotted lines in FIG. 3. With the rail 32 locked in its elevated position, pulling on the ring 66 will extract the pin 62 from the hole 64 in the frame 44. Permitting the handle 58 and lever 56 to rotate counter clockwise will cause the rail 32 to lower until the pin 62 is urged into the lower hole. The two holes serve to lock the rail 32 in either its lowered or elevated positions so that it is rendered immobile while the loader is driven from place to place.

While a preferred embodiment of the present invention has been shown and described herein, it will be appreciated that various changes and modifications may be made therein without departing from the spirit of the invention as defined by the scope of the appended claims.

What is claimed is:

1. A side guide for an aircraft belt loader having a conveyor with a frame, the improvement comprising:
   a guide rail positioned adjacent to, and extending substantially the length of said frame;

said guide rail including a vertical wall member and a flange formed along the upper edge thereof, said flange extending transverse to wall member and away from said frame;

a plurality of links, each pivoted at one end to said wall member and at the other end pivotally supported on said frame;

a bell crank pivotally supported on said frame and including a link arm pivotally attached to said wall member and a control lever for manual rotation of said bell crank between a lowered position in which said flange is positioned below said frame and an elevated position in which said flange is positioned above said frame; and said wall member has a vertical height sufficient to position the lower edge of said wall member below said frame when in said elevated position.

2. The invention according to claim 1, and further comprising lock pin means for selectively retaining said guide rail in the said lowered and elevated positions.

3. The invention according to claim 2, wherein said control handle is oriented, and has a length, to assure that said control lever is below said frame when said guide rail is in its lowered position.

* * * * *